(12) United States Patent
Koelsch et al.

(10) Patent No.: US 8,347,999 B2
(45) Date of Patent: Jan. 8, 2013

(54) POWER GENERATING UNIT FOR A VEHICLE AND METHOD THEREFOR

(75) Inventors: Robert Koelsch, Scottsdale, AZ (US); Mark Stoneman, Paradise Valley, AZ (US); Stanford Stoneman, Paradise Valley, AZ (US); Ronald G. Koelsch, Roscommon, MI (US)

(73) Assignee: Green Alternative Solar LLC, Phoenix, AZ (US)

( * ) Notice: Subject to any disclaimer, the term of this patent is extended or adjusted under 35 U.S.C. 154(b) by 233 days.

(21) Appl. No.: 12/492,348

(22) Filed: Jun. 26, 2009

(65) Prior Publication Data

US 2010/0327600 A1    Dec. 30, 2010

(51) Int. Cl.
B60K 25/10    (2006.01)

(52) U.S. Cl. .................... 180/165; 180/65.31

(58) Field of Classification Search ........... 180/65.1, 180/65.31, 165
See application file for complete search history.

(56) References Cited

U.S. PATENT DOCUMENTS

| | | | | |
|---|---|---|---|---|
| 881,599 | A * | 3/1908 | Maher | 105/114 |
| 2,159,885 | A | 5/1939 | Cullin | |
| 2,606,624 | A | 8/1952 | Chiotte | |
| 3,049,928 | A | 8/1962 | Boughner | |
| 3,812,379 | A * | 5/1974 | Kaufman et al. | 290/50 |
| 3,826,322 | A * | 7/1974 | Williams | 180/202 |
| 4,309,620 | A * | 1/1982 | Bock | 290/4 R |
| 4,314,160 | A * | 2/1982 | Boodman et al. | 290/55 |
| 4,496,016 | A | 1/1985 | Unsworth et al. | |
| 4,602,694 | A * | 7/1986 | Weldin | 180/2.2 |
| 5,147,003 | A * | 9/1992 | De Monclin | 180/14.2 |
| 5,178,403 | A * | 1/1993 | Kemner et al. | 280/423.1 |
| 5,275,248 | A * | 1/1994 | Finch et al. | 180/65.6 |
| 5,680,907 | A * | 10/1997 | Weihe | 180/2.2 |
| 5,762,161 | A * | 6/1998 | Caires et al. | 180/165 |
| 5,767,663 | A * | 6/1998 | Lu | 322/12 |
| 5,921,334 | A | 7/1999 | Al-Dokhi | |
| 5,971,088 | A * | 10/1999 | Smith | 180/165 |
| 6,220,381 | B1 * | 4/2001 | Damron et al. | 180/65.22 |
| 6,223,546 | B1 * | 5/2001 | Chopko et al. | 62/243 |
| 6,390,215 | B1 * | 5/2002 | Kodama et al. | 180/65.22 |
| 6,394,206 | B1 | 5/2002 | Fury | |
| 6,419,037 | B1 * | 7/2002 | Kramer et al. | 180/14.2 |
| 6,502,842 | B2 | 1/2003 | Ko | |
| 6,781,342 | B2 * | 8/2004 | Tolbert et al. | 318/784 |
| 7,102,245 | B2 * | 9/2006 | Duggan et al. | 290/1 R |
| 7,147,070 | B2 * | 12/2006 | Leclerc | 180/14.2 |
| 7,254,956 | B2 | 8/2007 | Matonog et al. | |
| 7,338,335 | B1 * | 3/2008 | Messano | 180/65.22 |
| 7,392,869 | B2 * | 7/2008 | Carlson et al. | 180/53.5 |

(Continued)

OTHER PUBLICATIONS

"Switched reluctance motor" Wikipedia article, at http://en.wikipedia.org/wiki/Switched_reluctance_motor; printed Aug. 4, 2011.

Primary Examiner — J. Allen Shriver, II
Assistant Examiner — Travis Coolman
(74) Attorney, Agent, or Firm — Louis J. Hoffman; William E. Markov (57) ABSTRACT

A power generation system has at least one wheel. A trailing arm is pivotably coupled to an undercarriage of a vehicle for converting rotational energy generated by the at least one wheel to electrical energy. A transformer is coupled to the trailing arm. An electric refrigeration unit is coupled to the transformer.

17 Claims, 6 Drawing Sheets

U.S. PATENT DOCUMENTS

| | | |
|---|---|---|
| 7,514,803 B2 | 4/2009 | Wilks |
| 7,547,980 B2 * | 6/2009 | Harrison .................. 290/1 R |
| 7,753,010 B2 * | 7/2010 | Rutledge ..................... 123/3 |
| 7,913,783 B2 * | 3/2011 | Elmaleh .................. 180/65.31 |
| 2004/0012205 A1 * | 1/2004 | Sua-An .................. 290/40 C |
| 2007/0187957 A1 | 8/2007 | Harrison |
| 2007/0261902 A1 * | 11/2007 | Margoudakis ............ 180/65.3 |
| 2008/0011007 A1 * | 1/2008 | Larson et al. ............ 62/323.2 |
| 2008/0289890 A1 | 11/2008 | Stoltzfus |
| 2010/0154449 A1 * | 6/2010 | Stover et al. ................ 62/236 |
| 2011/0030399 A1 | 2/2011 | Lifson et al. |

* cited by examiner

POWER GENERATING UNIT FOR A VEHICLE AND METHOD THEREFOR

BACKGROUND

Embodiments of this disclosure relate generally to electrical generating systems, and more particularly, to a generating system that is connected to the undercarriage of a motor vehicle and that contacts the road surface to generate electrical energy to be used by the motor vehicle.

Due to the depleting reserves of fossil fuels such as oil, there exists a need for alternative fuel vehicles which run on alternative energy sources. Presently, most efforts have been made to design vehicles which run on alternative energy supplies such as batteries, fuel cells, compressed natural gas, and the like. Unfortunately, many of these alternative energy supplies do not provide the same power output when compared to gasoline powered vehicles. Furthermore, there is a lack of infrastructure for replenishing many of these alternative fuel types.

Another issue with fossil fuel based propellants such as gasoline and diesel fuel is that these propellants burn dirty and pollute the environment. The combustion of fossil fuels and fossil fuel based propellants is considered to be the largest contributing factor to the release of greenhouse gases into the atmosphere.

Semi-tractors are a particular problem because of the above issues. Most semi-tractors are powered by fossil fuel based propellants such as gasoline or diesel fuel. Further, semi-tractors pull refrigerated trailers which require refrigeration units. These refrigerated trailers, sometimes called reefers, employ internal combustion engines to directly drive the compressor, fan and other components of the reefer. Modern day refrigeration reefer systems may further use an internal combustion engine to run a mechanical compressor directly. They also use the diesel engine to generate small amounts of AC power to run remote fans, evaporators and other small electrical demand components. These refrigeration reefer systems pollute the air and are noisy because they depend upon internal combustion engines and or diesel engines to provide their electrical needs. The diesel engines employed in mobile refrigeration applications are reliable and have low operating costs associated with them. Thus, most trucking companies are reluctant to replace the diesel engines employed in mobile refrigeration applications.

Up to this point a low cost all-electric alternative has not been invented for mobile refrigeration applications. Units driven by electricity only do not emit carbon based gases, are much quieter, and do not use diesel fuel during long at stop intervals. However, even if an all-electric alternative is designed, it must be capable of being retrofitted to existing semitrailers. The need for a retrofit design of existing diesel powered refrigeration units must demonstrate competitive costs to that of conventional diesel power refrigeration units. The demands to be simplistic and of hi-reliability are common goals. This hi-reliability requirement is due to the fact that refrigeration systems typically are preserving the delivery of perishable food goods to people. The most demanding missions are those where door-to-door deliveries are being made in metropolitan areas. This is demanding due to the long periods of refrigerator doors being opened to the outside air temperatures and trailer being at a standstill.

Therefore, it would be desirable to provide an apparatus that overcomes the above problems. The system and method would be an electric retrofit system which would replace current diesel engines to power mobile refrigeration systems.

SUMMARY

A power generation system has at least one wheel. A trailing arm is pivotably coupled to an undercarriage of a vehicle for converting rotational energy generated by the at least one wheel to generate electrical energy. A transformer is coupled to the trailing arm. An electric refrigeration unit is coupled to the transformer.

A power generation system has at least one wheel. A trailing arm is pivotably coupled to an undercarriage of a vehicle for converting rotational energy generated by the at least one wheel to electrical energy. A transformer is coupled to the trailing arm. An electric refrigeration unit is coupled to the transformer. A power management unit is coupled to the transformer and to the electric refrigeration unit. A rechargeable battery pack is coupled to the transformer and to the electric refrigeration unit.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

The present invention is an all-electric system for eliminating the current universal use of diesel engines to power mobile refrigeration systems. This invention includes a high power generating system, which is completely portable. The system may use solar power, battery packs, power management control systems and a unique hi-power generating apparatus to achieve long-term hi-power mobility. The system is capable of generating and managing continuous hi-power to mobile refrigeration systems for long periods of time. The system may be retrofitted to existing diesel-operated systems in the field. This system is designed to eliminate the use of diesel fuel and its associated pollution issues.

Figure 1:
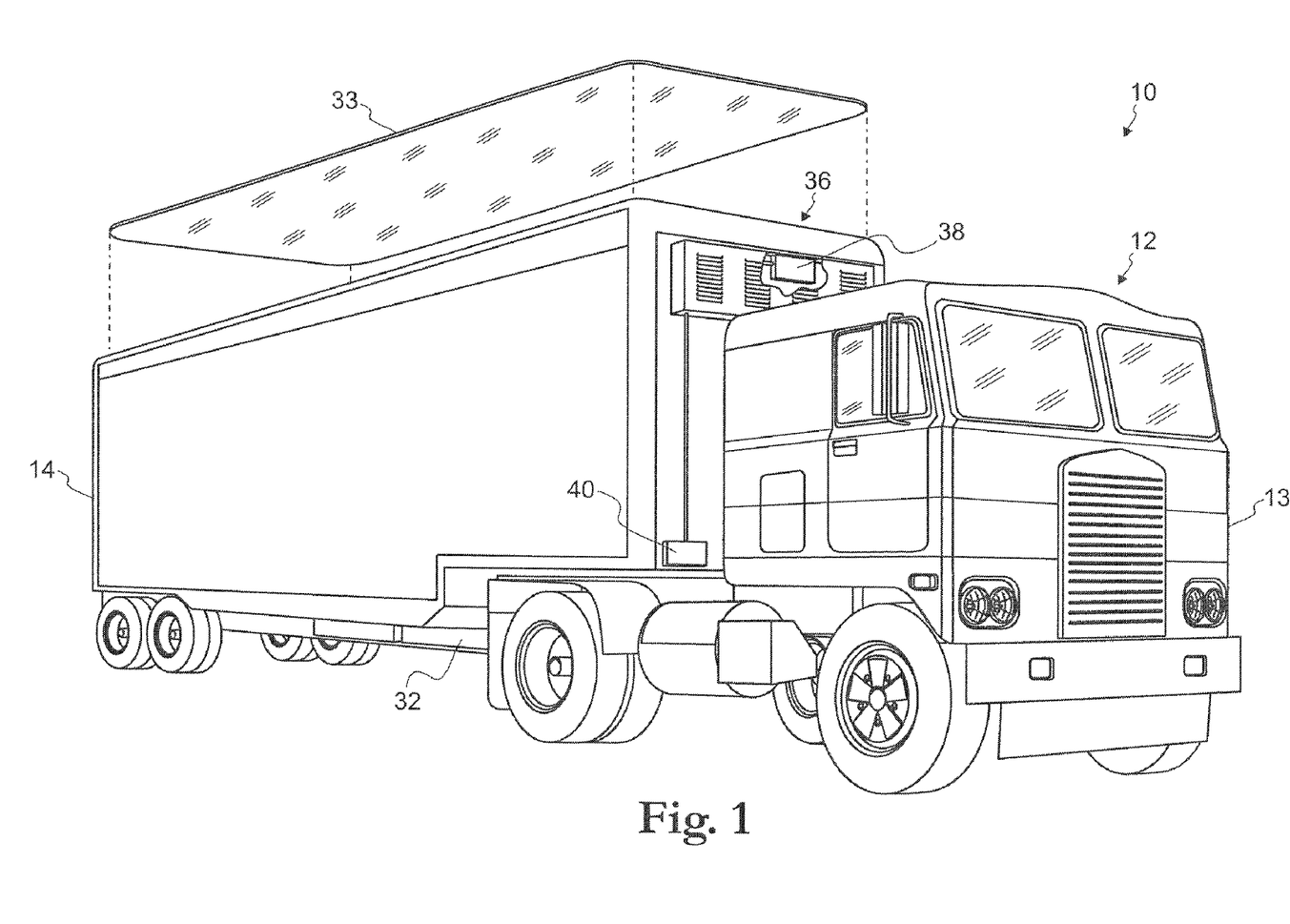
FIG. 1 is a perspective view of one embodiment of a semi-trailer incorporating the present invention.
Figure 2:
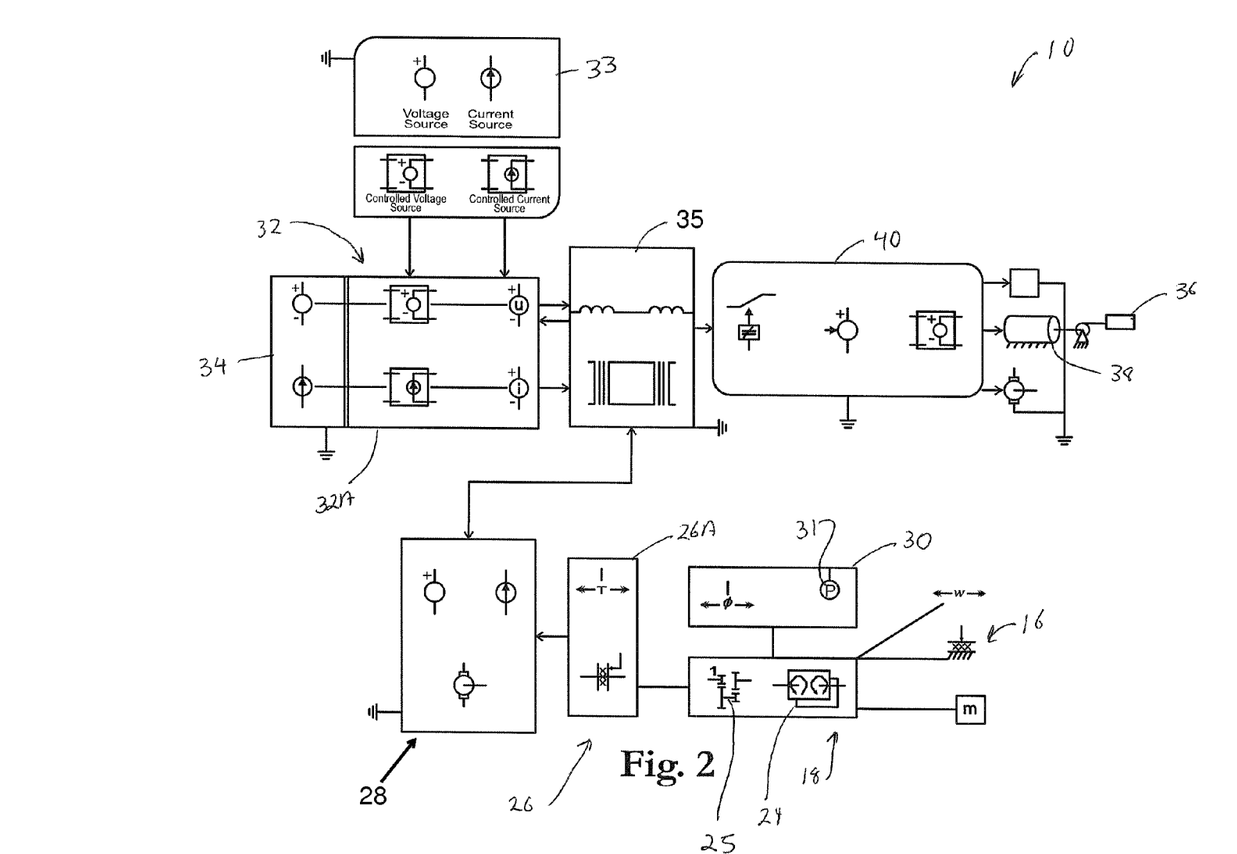
FIG. 2 is a simplified functional diagram of the circuitry used in the present invention.
Figure 3:
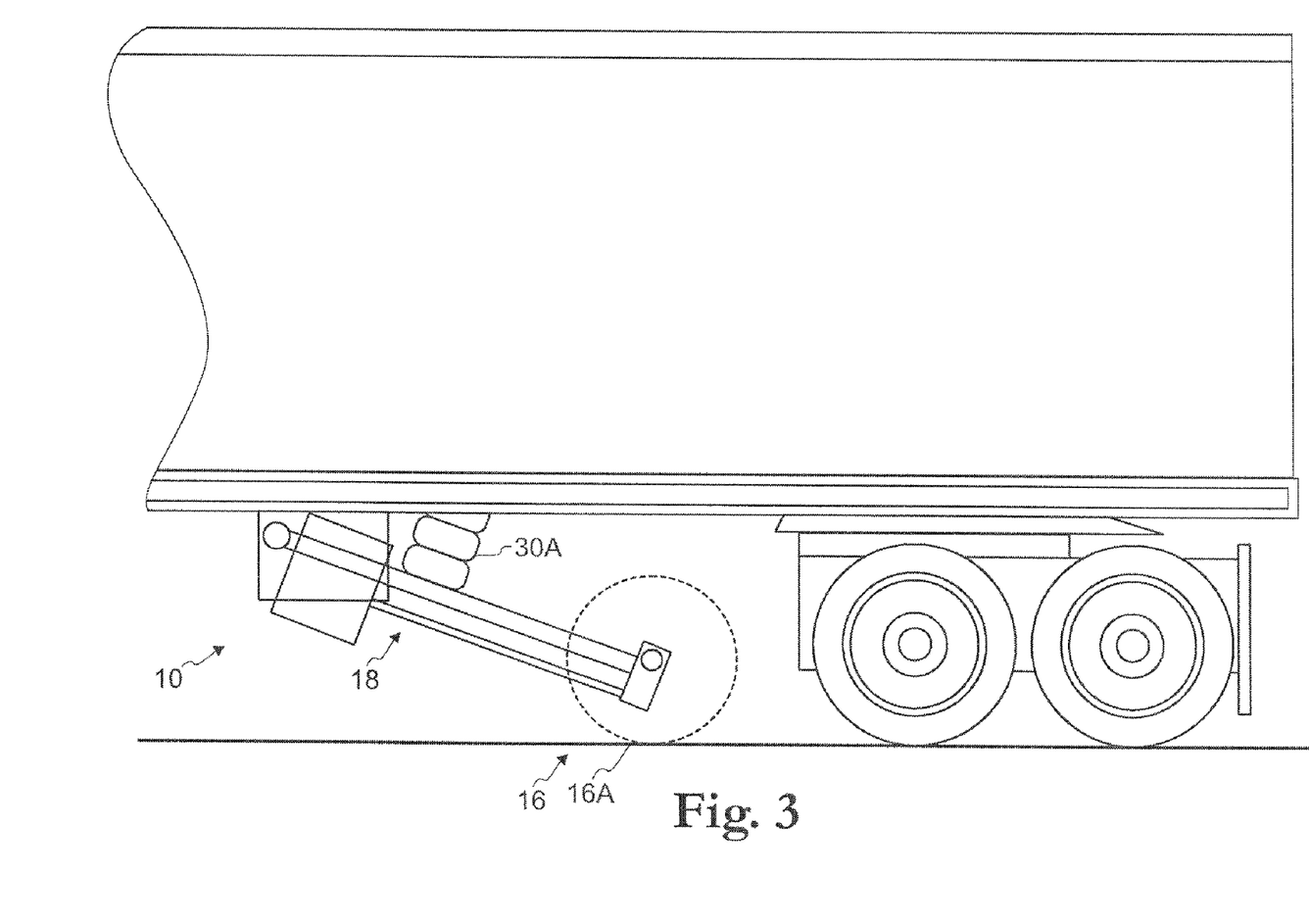
FIG. 3 is a partial side view of the power generating unit secured to the semi-trailer in a lowered position.
Figure 4:
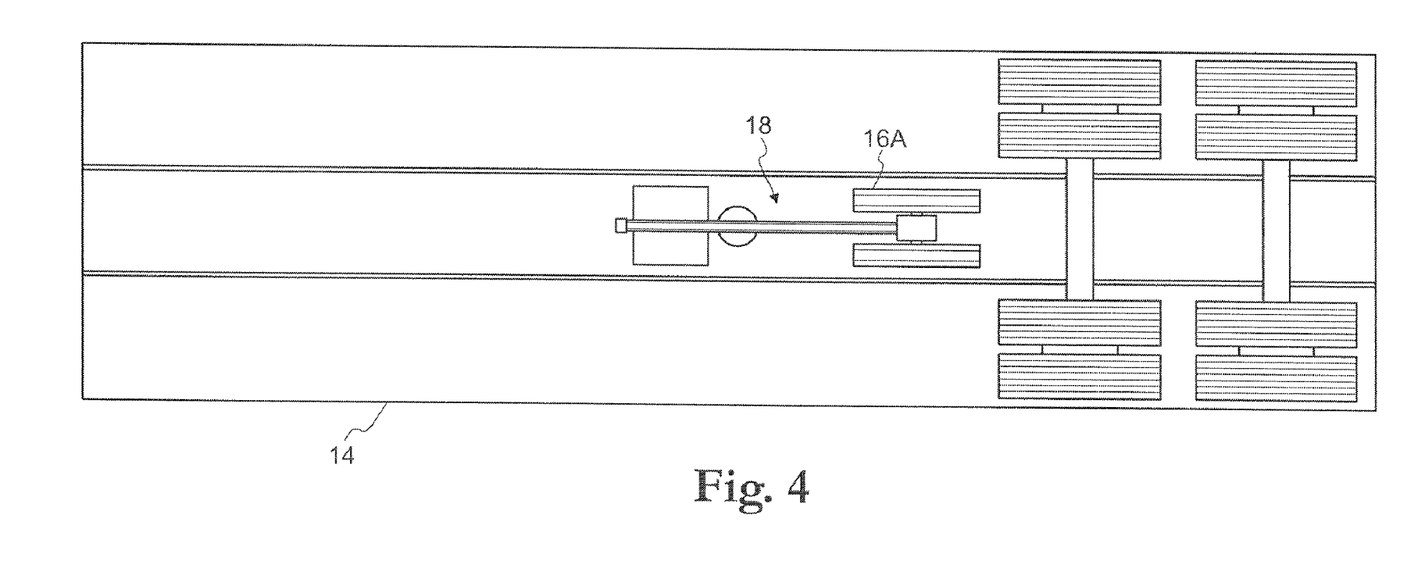
FIG. 4 is a bottom view of the semi-trailer with the power generating unit installed.

With reference now to FIGS. 1-6, a power generation system 10 is shown. The power generation system 10 is an electric system for eliminating the current universal use of diesel engines to power mobile refrigeration systems. As shown in FIG. 1, in accordance with one embodiment, the system 10 is incorporated into a semi-tractor 13 having a refrigerated trailer unit 14. However, the system 10 may be incorporated into other types of vehicles such as one-piece trucks, vans, and the like. The listing of the above is given as an example and should not be seen as to limit the scope of the present invention.

The system 10 has one or more contact devices 16. The contact devices 16 may be raised and lowered in order to generate mechanical energy. In accordance with one embodiment, the contact devices 16 are one or more wheels 16A. The wheels 16A, such as those used on automobiles, are attached at one end of a trailing arm 18. In the present embodiment, two wheels 16A are shown. However, this should not be seen as to limit the scope of the present invention.

The other end of the trailing arm 18 is coupled to an undercarriage of a vehicle 12. As shown in the Figures, the trailing arm 18 is mounted under the refrigerated trailer unit 14 pulled by a semi-tractor 13. The weight of the trailing arm 18 forces the wheels 16A to contact the road surface and through friction turn the wheels 16A.

In accordance with one embodiment, the trailing arm 18 is coupled to the vehicle 13 so as to be pivotable. A coupling device 21 may have a first end coupled under the refrigerated trailer unit 14. A second end of the coupling device 21 may be coupled to the trailing arm 18. The coupling device 21 is a pivotable device that moves both horizontally and vertically. This allows the trailing arm 18, and hence the wheels 16A, if the wheels 16A are in a lowered position, to adjust to the road surface and maintain contact with the road surface no matter the contour of the terrain. The pivotability of the trailing arm 18 both horizontally and vertically eliminates wheel scuffing and sidestress loads on the trailing arm 18 during turning and other maneuvers.

The trailing arm 18 may have a differential unit 22. The differential unit 22 may be located on a distal end of the trailing arm 18. The differential unit 22 may further be coupled to the wheels 16A. The differential unit 22 is used to transmit the rotational input from the wheels 16A and generate an output. Thus, the rotation of the wheels 16A is fed into the differential unit 22. The differential unit 22 provides an output rotation at a 90 degree angle to an axis of the wheels 16A.

A drive shaft 24 may have a first end coupled to the differential unit 22. The drive shaft 24 may be used to transfer the rotational output of the differential unit 22. In general, the differential unit 22 may be chosen to optimize the rotation speed of the connecting drive shaft 24.

The trailer axle and wheel assembly may have a power take off unit 27 positionable within the drive shaft 24. The power take off unit 27 may be used to power auxiliary components of the system 10 and or of the refrigerated trailer unit 14 and or the semi-tractor 13.

A second end of the drive shaft 24 is coupled to a transmission 25. The transmission 25 allows the rotation power generated to be transferred to a generator 28 which may be coupled to the transmission 25. In accordance with one embodiment, the transmission 25 is a constant speed transmission.

The transmission 25 may further have a torque limiter device 26. The torque limiter device 26 may be used to protect the generator 28. The torque limiter device 26 protects the generator from mechanical overload. The torque limiter device 26 may limit the torque by slipping or uncoupling the load entirely.

In accordance with one embodiment, the torque limiter device 26 may be a torque limiting clutch 26A. The torque limiting clutch 26A may be used to soften the start of rotation when the wheels 16A are lowered and to slip as the speed of the drive shaft 24 increases in order to limit the rotational speed of the connected generator 28. The slip speed is chosen to optimize the electrical output of the generator 28. For example, if the drive shaft 24 is rotating at approximately 3,000 rpm the generator 28 will only turn at approximately 1,800 rpm due to the slippage of the torque limiting clutch 26A.

Figure 5:
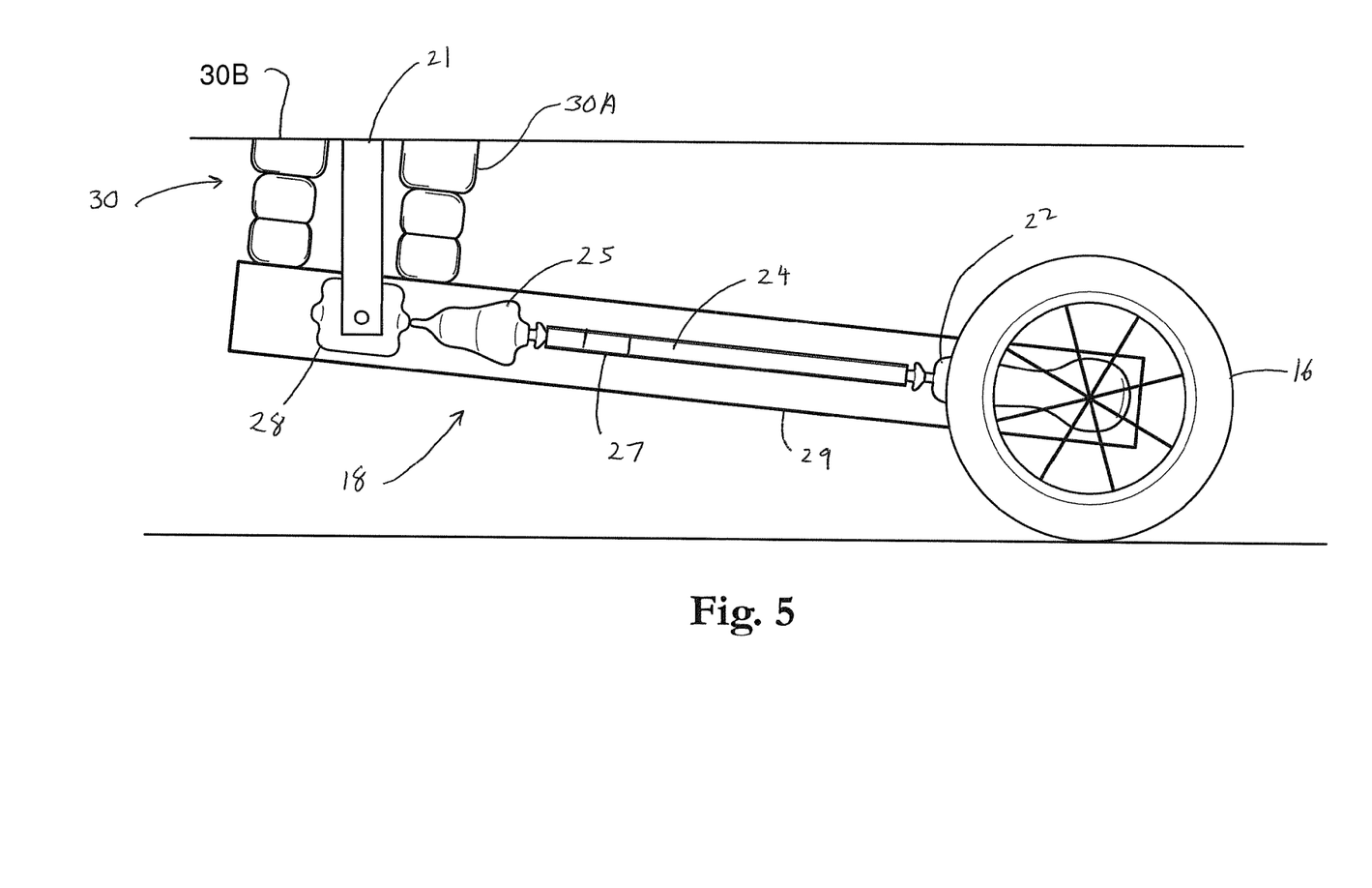
FIG. 5 is a magnified view of the power generating unit secured to the semi-trailer in a lowered position.
Figure 6:
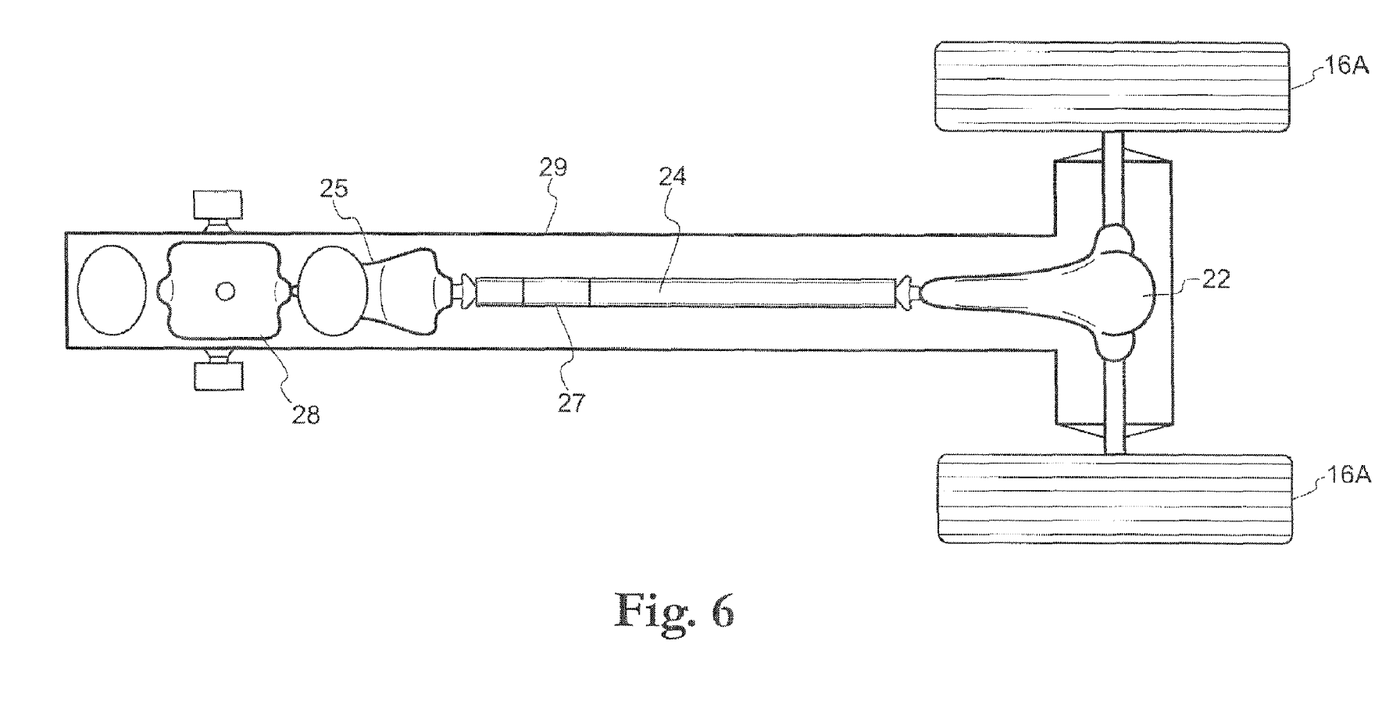
FIG. 6 is a top view of the power generating unit.

In accordance with one embodiment, the trailing arm 18 has a housing 29. The housing 29 is used to cover and protect the components of the trailing arm 18 from damage. Thus, as seen in FIG. 5, the housing 29 may be used to enclose the differential 22, the drive shaft 24, the torque limiter device 26, and the generator 28. However, the housing 29 may be used to cover more or less component parts without departing from the spirit and scope of the present invention.

As stated above, the wheels 16A may be raised and lowered. An actuator device 30 may be coupled to the trailing arm 18. The actuator device 30 may raise the trailing arm 18 and hence the wheels 16A when not in use and lower the trailing arm 18 and hence the wheels 16A to have the system 10 generate electrical energy. The actuator device 30 may have a position sensor 31. The position sensor will monitor a distance between the wheels 16A and the ground.

In accordance with one embodiment of the present invention, the actuator device 30 may be an air bag system 30A and 30B. The air bag system 30A and 30B may be inflated and deflated using an air pressure system (not shown). Many semi-tractors 13 and refrigerated trailer unit 14 already have air pressure systems that may be used with the air bag system 30A and 30B. The air bag system 30A will be inflate, which forces the trailing arm 18 downward. The combination of the weight of the refrigerated trailer unit 14, the air bag system 30A being inflated, and the coupling device 21 allowing downward vertical movement, forces the wheels 16A to ride along the road surface. When inflated, the air bag system 30A further acts as a suspension spring further helping the wheels 16A adjust to the road surface and maintain contact with the road surface no matter the contour of the terrain.

When the trailing arm 18 needs to be raised, the air bag system 30A deflates and 30B inflates. This causes the trailing arm 18 to raise back-up lifting the wheels 16A above the road surface. In accordance with one embodiment, when the air bag system 30A deflates, the trailing arm 18 is no longer being pushed downward. This allows the coupling device 21 to return back to a normal resting position which further helps to raise the trailing arm 18.

The system 10 may further have a battery pack 32. The battery pack 32 may be a rechargeable battery pack 32A. The battery pack 32 may be stored in a bottom section of the refrigerated trailer unit 14. The rechargeable battery pack 32A may be coupled to a charging dock 34. The charging dock 34 may allow the rechargeable battery pack 32A to be coupled to auxiliary line power to charge the rechargeable battery pack 32A when the refrigerated trailer unit 14 is stationary and auxiliary line power is available. Alternatively, solar panels 33 may be coupled to and used to recharge the rechargeable battery pack 32A. The solar panels 33 may be coupled to a top surface of the refrigerated trailer unit 14. The solar panels 33 may be low profile to provide the least amount of drag for the refrigerated trailer unit 14. The solar panels 33 may further be flexible and pliable to accommodate the hazards of road travel. Over time these flexible solar panels or films are projected to become more powerful per square inch and therefore will play an increasingly important role in supplying power to the overall system design.

Power from the generator 28 may also be used to charge the rechargeable battery pack 32A. In this embodiment, the generator 28 is coupled to a transformer 35. The transformer 35 alters the electrical energy from the generator 28 so that the electrical energy from the generator 28 may be used to charge the rechargeable battery pack 32A.

The rechargeable battery packs 32A may be used to run an electric refrigeration unit 36. Alternatively, the batteries may be used to power an electric motor 38 which may be used to run the electric refrigeration unit 36. In this embodiment, the stored energy from the rechargeable battery packs 32A may have to run through the transformer 35. The transformer 35 will alter the electrical energy from the rechargeable battery pack 32A to be used by the electric refrigeration unit 36 and or the electric motor 38.

A power management device 40 may be coupled to the electric refrigeration unit 36 and or the electric motor 38. The power management device 40 may further be coupled to the transformer 34. The power management device 40 may be used to control the power distribution to the electric refrigeration unit 36 and or the electric motor 38.

In operation, when the semi-tractor 13 and refrigerated trailer unit 14 are in motion, the trailing arm 18 may be lowered causing the wheels 16A to contact the road surface. The rotational energy of the wheels 16A is transferred to the generator 28 to create electrical energy. The electrical energy from the generator 28 powers an electric motor 38 which in turns runs a compressor of the electric refrigeration unit 36. Alternatively, electrical energy from the generator 28 may directly power the compressor of the electric refrigeration unit 36. Further, when the semi-tractor 13 and refrigerated trailer unit 14 are in motion, the system 10 also may route electrical energy from the generator 28 to the rechargeable battery pack 32A. This electrical energy from the generator 28 is used for charging of the rechargeable battery pack 32A.

The generator 28 should be designed to generate upwards of 20 kw of immediate power. The generator 28 is using the velocity of the semi-tractor 13 and refrigerated trailer unit 14 to generate hi-power and current to run the compressor of the electric refrigeration unit 36. The flow of power directly to the compressor of the electric refrigeration unit 36, or alternatively, to the electric motor 38 that may run the compressor of the electric refrigeration unit 36, should switch to the rechargeable battery pack 32A when the generator 28 falls below a certain rpm threshold. The rate at which the generator 28 should generate power should be matched carefully to the current draw of the compressor of the electric refrigeration unit 36, or alternatively, to the current draw of the electric motor 38 that may run the compressor of the electric refrigeration unit 36.

In operation, when the semi-tractor 13 and refrigerated trailer unit 14 are not in motion, the trailing arm 18 may be raised. Stored electrical energy from the rechargeable battery pack 32A may be used to power and run the electric motor 38, which in turn runs a compressor of the electric refrigeration unit 36. Alternatively, electrical energy from the rechargeable battery pack 32A may directly power the compressor of the electric refrigeration unit 36. Auxiliary line power if available may be used to charge the rechargeable battery pack 32A and run the electric refrigeration unit during situations where the semi-tractor 13 and refrigerated trailer unit 14 is stationary and line power is available. Solar panels 33 may be used to provide additional energy for charging the rechargeable battery pack 32A.

All components of the system 10 may be mounted to a refrigerated trailer unit 14 making it self contained and independent of the tractor configuration. This mobile system 10 may be mounted on a variety of vehicles and used to run many different types of electrical units.

The system 10 would provide the trucking industry with semi-trailer refrigeration that meets reduced pollution requirements and idle limit mandates. Currently, refrigeration units pollute the air and are noisy because they depend upon diesel engines to provide their electrical needs. The system 10 reduces pollution and fuel consumption by replacing the diesel engine with an all-electric system.

While embodiments of the disclosure have been described in terms of various specific embodiments, those skilled in the art will recognize that the embodiments of the disclosure can be practiced with modifications within the spirit and scope of the claims.

What is claimed is:

1. An electrical power generation apparatus, attachable to a vehicle having a refrigeration unit and an underside, the apparatus comprising:
    (a) a coupling device attachable to the underside;
    (b) a trailing arm comprising:
        (i) a first end pivotably coupled to the coupling device so that the trailing arm can pivot both vertically and laterally, and
        (ii) a second end coupled to at least one free-rotating wheel;
    (c) an air bag coupled to the vertically pivotable and laterally pivotable trailing arm, at a position between the first end and second end, and between the trailing arm and the underside, so that, when the air bag is inflated, the second end of the trailing arm is pivoted downward and the at least one free-rotating wheel is pressed against a road surface;
    (d) a generator mechanically coupled to and driven by the at least one free-rotating wheel and electrically coupleable to the refrigeration unit; and
    (e) a position sensor coupled to the trailing arm.

2. The electrical power generation apparatus of claim 1, further comprising a rechargeable battery pack electrically coupled the generator and electrically coupleable the refrigeration unit, wherein the generator is electrically coupleable to the refrigeration unit through the rechargeable battery pack.

3. The electrical power generation apparatus of claim 2, further comprising at least one auxiliary power source electrically coupled to the rechargeable battery pack.

4. The electrical power generation apparatus of claim 3, further comprising a charging dock electrically coupled between the at least one auxiliary power source and the rechargeable battery pack.

5. The electrical power generation apparatus of claim 3, wherein the at least one auxiliary power source comprises an auxiliary power line electrically coupleable to a stationary power source.

6. The electrical power generation apparatus of claim 3, wherein the at least one auxiliary power source comprises a solar panel.

7. The electrical power generation apparatus of claim 2, further comprising a transformer electrically coupled between the rechargeable battery pack and the generator.

8. The electrical power generation apparatus of claim 1, further comprising a torque limiter mechanically coupling the at least one free-rotating wheel and the generator, and structured to at least partially uncouple the at least one free-rotating wheel and the generator when torque exceeds a predetermined value.

9. The electrical power generation apparatus of claim 8, wherein the torque limiter comprises a soft starter.

10. The electrical power generation apparatus of claim 1, further comprising an auxiliary power take-off mechanically coupled to and driven by the free-rotating wheel, whereby rotational energy from the at least one free-rotating wheel is made available to a component coupled to the vehicle other than the generator.

11. The electrical power generation apparatus of claim 1, further comprising:
(i) a differential mechanically coupled to the at least one free-rotating wheel;
(ii) a drive shaft mechanically coupled to the differential; and
(iii) a transmission comprising a first end mechanically coupled to the drive shaft and a second end mechanically coupled to the generator;
(iv) wherein the generator is mechanically coupled to and driven by the at least one free-rotating wheel through the mechanical couplings among the differential, drive shaft, and transmission.

12. The electrical power generation apparatus of claim 1, further comprising:
(i) a rechargeable battery pack electrically coupled to the generator and electrically coupleable to the refrigeration unit;
(ii) a power management controller electrically coupled to the battery pack and the generator, and electrically coupleable to the refrigeration unit;
(iii) wherein the power management controller is configured:
(1) to cause the refrigeration unit to draw electrical energy from the generator,
(2) to cause the generator to charge the rechargeable battery pack, and
(3) in response to detecting the rate of electrical energy supplied by the generator decreasing below a predetermined threshold, to cause the refrigeration unit to draw electrical energy from the rechargeable battery pack.

13. The electrical power generation apparatus of claim 1, further comprising an electric motor electrically coupled to the generator and mechanically coupleable to the refrigeration unit.

14. The electrical power generation apparatus of claim 1, further comprising a transformer electrically coupled to the generator and electrically coupleable to the refrigeration unit.

15. A method of retrofitting a vehicle having a fuel-powered engine that generates electrical energy for a refrigerator unit mounted on the vehicle, the method comprising:
(a) removing the fuel-powered engine;
(b) mounting a generator on the vehicle;
(c) mounting, to an underside of the vehicle, a trailing arm assembly by mounting a coupling device to the underside of the vehicle, wherein the trailing arm assembly comprises:
(i) a trailing arm;
(ii) the coupling device, which is pivotably coupled to a first end of the trailing arm so that the trailing arm can pivot both vertically and laterally;
(iii) a position sensor coupled to the trailing arm; and
(iv) an air bag;
(d) mechanically coupling the generator and a free-rotating wheel mounted under the vehicle and coupled to a second end of the trailing arm, which wheel is positioned to rotationally contact a road surface at least at some times when the vehicle is in operation;
(e) mounting a rechargeable battery pack on the vehicle;
(f) electrically coupling the generator to the rechargeable battery pack, whereby the rechargeable battery pack stores electrical energy produced by the generator when the wheel rotates against the road surface; and
(g) electrically coupling the rechargeable battery pack to the refrigerator unit, whereby the rechargeable battery pack supplies electrical energy to the refrigerator unit;
(h) wherein the air bag is coupled to and positioned on a top side of the trailing arm at a place between the first end and the second end of the trailing arm, such that, when the trailing arm assembly is mounted to the underside of the vehicle, the air bag is positioned between the trailing arm and the underside of the vehicle and, when inflated, the air bag causes the second end of the trailing arm to pivot downward and press the wheel against the road surface.

16. The method of claim 15, further comprising:
(i) mounting a solar panel on the refrigerated vehicle; and
(ii) electrically coupling the solar panel to the rechargeable battery pack, whereby the solar panel charges the rechargeable battery pack.

17. The method of claim 15, further comprising mechanically coupling an auxiliary power take-off to the free-rotating wheel, whereby rotational energy from the wheel is made available to a component coupled to the vehicle other than the generator.

* * * * *